United States Patent [19]

Masch et al.

[11] 4,247,961

[45] Feb. 3, 1981

[54] PILLOW-FIRST AID KIT WITH EJECTOR

[76] Inventors: Vladimir Masch, 35 Midvale Dr.; Alexander Zamikhovsky, 48 Shelley Dr., both of New Providence, N.J. 07974

[21] Appl. No.: 55,552

[22] Filed: Jul. 9, 1979

[51] Int. Cl.³ .......................... A47C 27/00; A47Q 9/00
[52] U.S. Cl. ............................. 5/442; 5/434; 5/485; 297/397
[58] Field of Search ............... 297/218, 391, 397; 5/442, 480, 485, 490

[56] References Cited

U.S. PATENT DOCUMENTS

| | | | |
|---|---|---|---|
| 1,617,822 | 2/1927 | O'Leary | 5/442 |
| 2,293,530 | 8/1942 | Beehler | 5/442 |
| 2,404,109 | 7/1946 | Steele . | |
| 3,063,749 | 11/1962 | Struble et al. | 297/218 |
| 3,089,154 | 5/1963 | Boyles | 5/447 |
| 3,148,389 | 1/1970 | Lustig . | |
| 3,205,005 | 9/1964 | Brown | 297/397 |
| 3,489,194 | 1/1970 | Hoover | 5/420 |
| 3,594,833 | 7/1971 | Richter | 5/480 |
| 3,863,283 | 2/1975 | Mohr | 5/442 |
| 4,087,145 | 5/1978 | Weavers | 312/319 |

*Primary Examiner*—Casmir A. Nunberg

[57] ABSTRACT

A pillow, which may take the form of an automobile headrest, has a fastener that controls communication to an interior compartment of the pillow. A removable shock absorber liner fits into the interior compartment and defines a pocket which is adapted to receive and store first aid (medical) supplies and emergency equipment. An elastic body fits into the pocket in the liner. The shock absorber liner and the elastic body are both easily removable from the interior of the pillow and are useful as first aid equipment. With the fastener open, a plastic, transparent organizer containing first aid equipment and emergency supplies is inserted into the pocket of the liner. This compresses the elastic body. The fastener is then closed. When the fastener is opened, the organizer is automatically at least partially ejected from the pillow.

19 Claims, 14 Drawing Figures

U.S. Patent  Feb. 3, 1981  Sheet 2 of 3  4,247,961
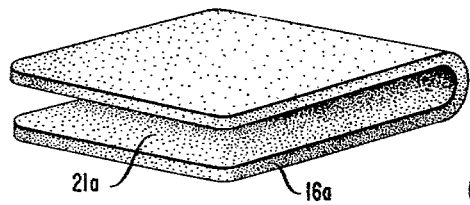
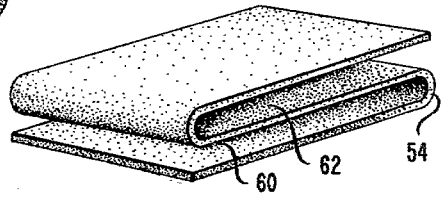
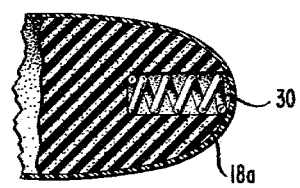
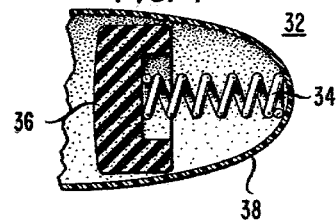
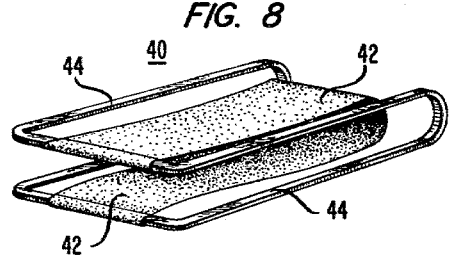
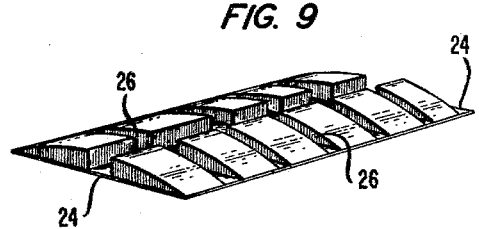
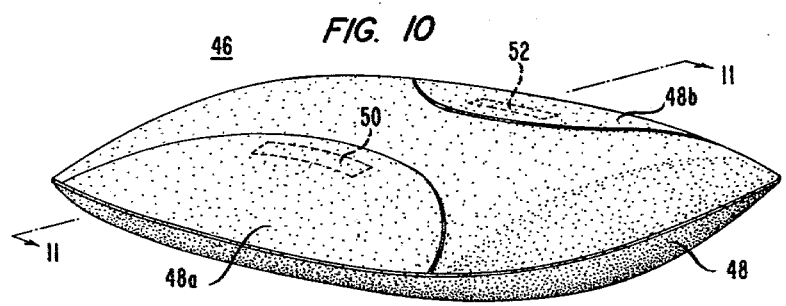

PILLOW-FIRST AID KIT WITH EJECTOR

BACKGROUND OF THE INVENTION

This invention relates to a pillow-first aid kit combination and, in particular, to a pillow having an interior pocket adapted to receive first aid supplies and equipment and to at least partially eject same when a fastener which controls access to the interior compartment of the pillow is opened.

Large numbers of people are injured in automobile accidents every year. Many first aid kits are packaged in metal, plastic, or cardboard containers and are stored in the glove compartment or trunk of an automobile. Immediately after an accident valuable time is lost in having to unlock and open the compartment or trunk and then find and remove the first aid kit. If the first aid kit is placed in the cab of an automobile, it may fly about and injure someone if there is an accident or sudden stop.

U.S. Pat. No. 3,863,283 discloses a pillow having an interior compartment that is adapted to receive first aid supplies. One disadvantage of this pillow is that time is lost after a fastener of the pillow is opened because one must reach inside it, find the desired items, and then pull them out. Another disadvantage is that the shock absorbing material of the pillow is essentially permanently secured within the structure of the pillow and cannot be removed and used for first aid needs.

It would be desirable to have a pillow-first aid kit in which supplies stored therein are automatically ejected when a fastener is opened and in which the shock absorbing material is easily removable from the pillow such that it can be used to attend the needs of one who is injured.

SUMMARY OF THE INVENTION

The present invention is directed to a pillow which has an outer casing that defines an interior compartment which is accessible through at least one opening in the casing. Access control means is joined to the casing to control access therethrough. A shock absorber member (liner) having a pocket adapted to store objects such as medical supplies and equipment is adapted to fit inside the casing and to provide comfortable padding for a person resting on the pillow. Ejector means, which is adapted to fit into the pocket of the liner and to cause objects stored in the pocket of the liner to be at least partially ejected when the fastener is opened, exists in the pocket of the liner.

In one illustrative embodiment the access control means, which may also be referred to as a fastener, is a zipper, the shock absorber member (liner) is a sheet of foam material folded in half, and the ejector means is an elastic body. An organizer, typically constructed of a transparent plastic and having a plurality of pockets in which medical supplies and equipment can be placed, is loaded with supplies and equipment and then inserted through the opening in the casing and into the pocket of the liner. This causes the elastic body to be compressed. The fastener is then closed so as to seal up the opening through the casing. The compressed elastic body forces the organizer towards the sealed opening in the casing. When the fastener is opened, the organizer is automatically at least partially ejected from the pillow. The liner and elastic body can be easily removed from the interior compartment of the casing and may be used to aid and/or comfort an injured or sick person.

In another illustrative embodiment the pillow has multiple openings through the casing, multiple access control means (fasteners), and a shock absorber member (liner) which has a number of pockets corresponding to the number of openings in the casing. A separate ejector means is in each pocket of this liner.

In another illustrative embodiment the pillow forms a part of a headrest which has a flap and a fastener that controls access to an interior compartment in which there is a shock absorber member (liner) and an ejector means. First aid supplies and equipment and other objects can be stored in this compartment. These objects are automatically at least partially ejected when the flap is opened.

The automatic ejection feature of the pillow facilitates the supplies stored therein being made rapidly available for medical emergencies. In addition, the shock absorber liner and ejector means can be used to aid one who is injured or sick.

These and other features and advantages of the invention will be better understood from a consideration of the following description taken in conjunction with the accompanying drawings.

BRIEF DESCRIPTION OF THE DRAWINGS

FIG. 5 illustrates another embodiment of a shock absorber member (liner) which can be used with the pillow of FIGS. 1, 2, and 3;

FIG. 6 illustrates an embodiment of an ejector means which can be substituted for the ejector means illustrated in FIGS. 2 and 3;

FIG. 7 illustrates another embodiment of an ejector means which can be substituted for the ejector means illustrated in FIGS. 2 and 3;

FIG. 8 illustrates still another embodiment of an ejector means which can be substituted for the ejector means illustrated in FIGS. 2 and 3;

FIG. 9 illustrates a perspective view of an unwrapped organizer of the type illustrated in FIGS. 2 and 3;

FIGS. 10 and 11 illustrate a perspective view (FIG. 10) and a sectional view (FIG. 11, taken substantially along the line 11—11 of FIG. 10) of another pillow in accordance with the present invention;

FIG. 12 illustrates a perspective view of the shock absorber member (liner) of the pillow illustrated in FIGS. 10 and 11.

DETAILED DESCRIPTION

Figure 1:
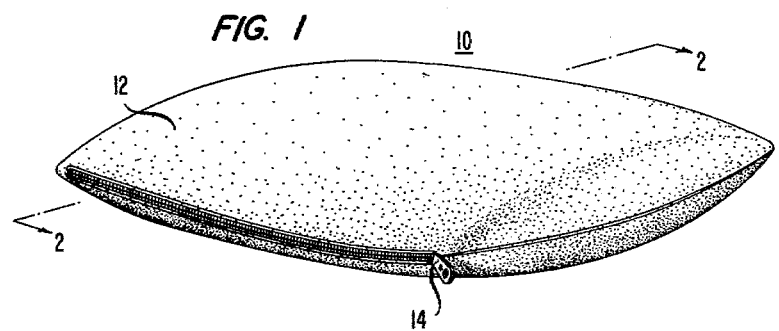
FIGS. 1, 2, and 3 illustrate a perspective view (FIG. 1) and two sectional views (FIGS. 2 and 3, both taken substantially along the line 2—2 of FIG. 1) of a pillow in accordance with the present invention.
Figure 2:
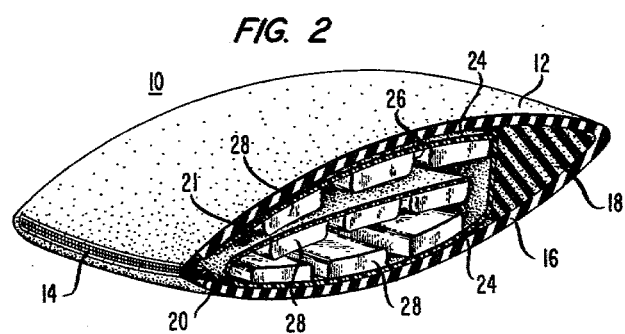
Figure 3:
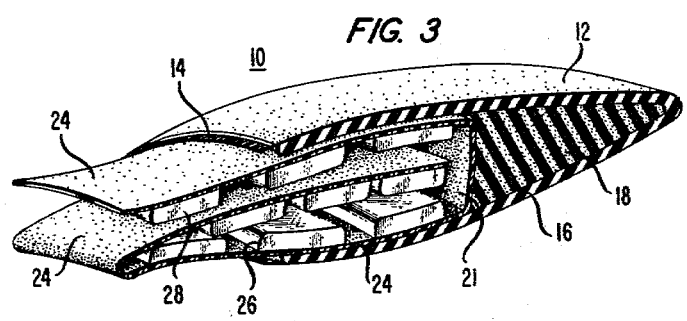

Referring now to FIGS. 1, 2, and 3 there is illustrated a perspective view (FIG. 1) and two cross-sectional views (FIGS. 2 and 3, both taken substantially along line 2—2 of FIG. 1) of one embodiment of a pillow 10 in accordance with the present invention. Pillow 10 has an outer casing 12 which defines an interior compartment 20, access control means which may be referred to as a fastener and is illustrated as a zipper 14, a shock absorber member (liner) 16, and an ejector means which is illustrated as an elastic body 18. It is to be appreciated that pillow 10 can have a variety of geometric shapes other than the square shape illustrated.

Figure 4:
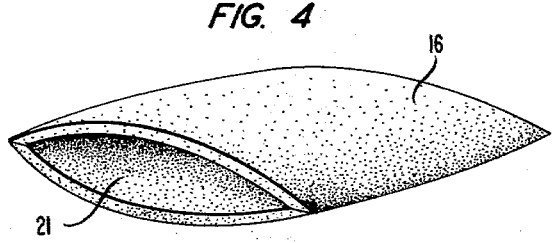
FIG. 4 illustrates one embodiment of a shock absorber member (liner) which can be used with the pillow of FIGS. 1, 2, and 3.

Shock absorber liner 16 is illustrated contained within interior compartment 20 of casing 12 and is configured so as to define a pocket 21. Shock absorber liner 16 is not attached to casing 12 and can be removed from casing 12. FIG. 4 illustrates one embodiment of shock absorber liner 16 which comprises a single sheet of foam or sponge-like material which is folded in half with the sides being sewn together and the front serving as the opening to pocket 21. FIG. 5 illustrates another embodiment of a shock absorber liner 16a (with a pocket 21a) which is similar to shock absorber liner 16 of FIG. 4, except that none of the sides are sewn together.

Elastic body 18 is illustrated contained within a portion of pocket 21 of shock absorber liner 16. In FIG. 2 a wrapped up organizer 24 having pockets 26 in which medical supplies and equipment 28 are stored is illustrated stored within pocket 21 of shock absorber liner 16. Zipper 14 is illustrated in the closed position and elastic body 18 is compressed such that it applies a force against organizer 24 that causes organizer 24 to be pushed up towards the zipped up opening in casing 12. In FIG. 3 zipper 14 is illustrated in the open position and elastic body 18 is illustrated as expanded. Organizer 24 is illustrated as either being partially ejected from pillow 10 or as being partially inserted into pillow 10.

It is to be appreciated that in case of a medical emergency, when zipper 14 is opened, organizer 24 is quickly at least partially ejected from pillow 10 and thus the medical supplies and equipment 28 stored in organizer 24 can be quickly utilized. Elastic body 18 and shock absorber liner 16, which are both adapted to be used as first aid equipment, can be removed from casing 12 and used to tend to the medical needs of an injured or sick person. It is to be further appreciated that the pillow is a relatively soft body. Even if during an accident or sudden short stop it flies around the cab of an automobile, there is little probability that there will be harm to any person in the automobile.

Referring now to FIG. 6 there is illustrated another embodiment of an ejector means which comprises an elastic body 18a with a spring 30 contained therein. The combination of elastic body 18a and spring 30 can be substituted for elastic body 18 of FIGS. 2 and 3.

Referring now to FIG. 7 there is illustrated another embodiment of an ejector means which comprises a spring-piston assembly 32 which comprises a spring 34, a piston 36, and an outer housing 38. Assembly 32 can be substituted for ejector body 18 of FIGS. 2 and 3.

Referring now to FIG. 8 there is illustrated another embodiment of an ejector means which is a catapult ejector 40 which comprises an elastic band 42 attached to a frame member 44. Catapult ejector 40 can be substituted for elastic body 18 of FIGS. 1 and 2.

Referring now to FIG. 9 there is illustrated a perspective view of an unwrapped organizer 24 having pockets 26. In one embodiment organizer 24 is fabricated from a flexible, transparent plastic. This makes it easy to quickly identify different medical supplies stored in pockets 26.

Shock absorber liners 16 and 16a are preferably a sheet of porous, thermoinsulating, elastic, and soft material such as foamed polyurethane. The thermoinsulating characteristic of liners 16 and 16a serves to protect the stored medical supplies from temperature gradients as might be caused by the sun. Liners 16 and 16a can be used as sponges, or as a soft layer to be put under an injured person. Liners 16 and 16a can be covered with a smooth solid or air hole perforated film (not illustrated) of a material such as polyethylene so as to reduce friction when the organizer 24 or liners 16 and/or 16a are removed from casing 12.

Organizer 24 is preferably made of a transparent, flexible material such as polyethylene sheet or film. A ring or cord (both not illustrated) can be attached to organizer 24 to ease the complete removal thereof from pillow 10.

Elastic body 18 is preferably a strongly elastic, soft, and porous material such as elastomeric foam. It can be used as a sponge or can be placed under the head or injured limb of a person.

The embodiment of FIGS. 1, 2, and 3 has been fabricated with casing 12 being plastic and being approximately 14 inches square. Liner 16 and elastic body 18 are both made out of polyurethane. Liner 16 is covered by a plastic, smooth film (not illustrated) which has multiple holes therethrough. Organizer 24 is plastic and is approximately 2.5 feet long and 10 inches wide.

Figure 11:
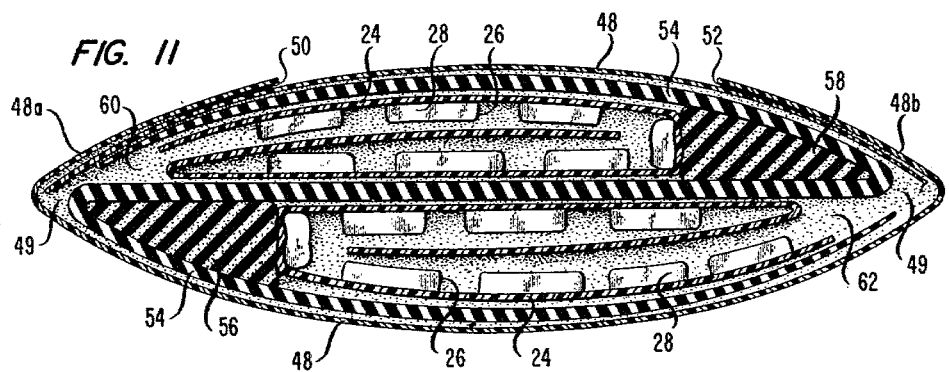

Referring now to FIGS. 10 and 11 there is illustrated a perspective view (FIG. 10) and a sectional view (FIG. 11, taken substantially along line 11—11 of FIG. 10) of another embodiment of a pillow 46 in accordance with the present invention. Pillow 46 has an outer casing 48 that has flaps 48a and 48b, two separate fasteners, which are illustrated as VELCRO-type (a trademark of VELCRO, USA, Inc.) fasteners 50 and 52, a shock absorber member (liner) 54, and two ejector means, which are illustrated as elastic bodies 56 and 58. Casing 48 defines an interior compartment 49. It is to be appreciated that pillow 46 can have a variety of geometric shapes other than the square shape illustrated.

Shock absorber liner 54 is illustrated contained within casing 48 and is configured so as to contain pockets 60 and 62. Shock absorber liner 54 is not attached to casing 48 and can be relatively easily removed from casing 48. FIG. 12 illustrates a perspective view of shock absorber member (liner) 54 which comprises a single sheet of foam or sponge-like material which is folded twice to define pockets 60 and 62.

Elastic body 56 is contained within a portion of pocket 62 and elastic body 58 is contained within a portion of pocket 60. A separate wrapped up organizer 24, which has pockets 26 in which medical supplies and equipment 28 are stored, is illustrated stored within each of pockets 60 and 62. VELCRO-type fasteners 50 and 52 fasten the flaps 48a and 48b to casing 48. Elastic bodies 56 and 58 are illustrated compressed such that the two organizers 24 are forced towards the closed openings in casing 48. If fastener 50 or 52 is opened, then the organizer 24 contained in the respective corresponding pocket in shock absorber liner 54 is at least partially ejected from pillow 46.

Referring now to FIG. 12 there is illustrated a perspective view of the shock absorber member (liner) 54 of FIG. 11. Shock absorber member (liner) 54 comprises a single sheet of foam or sponge-like material which is folded twice to define pockets 60 and 62.

Figure 13:
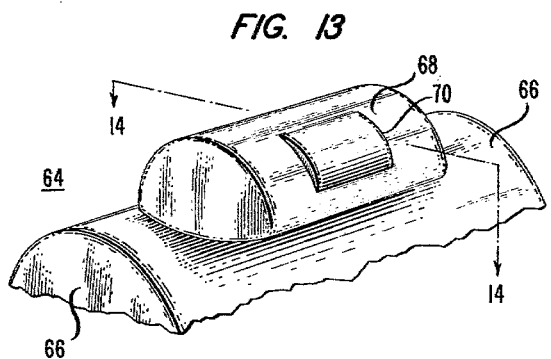
FIGS. 13 and 14 illustrate a perspective view (FIG. 13) and a sectional view (FIG. 14, taken substantially along the line 14—14 of FIG. 13) of an automobile headrest-pillow in accordance with the present invention.
Figure 14:
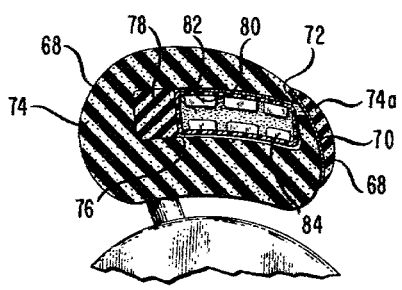

Referring now to FIGS. 13 and 14 there is illustrated a perspective view (FIG. 13) and a sectional view (FIG. 14 taken substantially along line 14—14 of FIG. 13) of a headrest-pillow 64 in accordance with the present invention. Headrest-pillow 64 is illustrated mounted on top of a backrest of a seat 66 of an automobile. Headrest-pillow 64 has an outer casing 68 which has a flap member 70 that can be fastened to or unfastened from casing 68 by opening or closing access control means which is illustrated as a VELCRO-type fastener 72.

A shock absorber member (liner) 74 is illustrated contained within casing 68 and is configured to define a pocket 76. Shock absorbing material 74a covers flap 70 to protect a person who might be forced up against headrest-pillow 64 when there is an accident or a sudden stop of the automobile. An ejector means consisting of elastic body 78 is illustrated contained within a portion of pocket 76 of shock absorber liner 74. An organizer 80, which has pockets 82 that are adapted to hold first aid supplies and equipment 84, is illustrated stored within pocket 76. Organizer 80 can be similar in design to organizer 24 of FIG. 9. Flap 70 is illustrated fastened to casing 68 by fastener 72. Elastic body 78 is illustrated compressed such that it applies a force against organizer 80 that causes organizer 80 to be pushed up against flap 70. When flap 70 is opened, organizer 80 is automatically at least partially ejected from headrest-pillow 64.

Elastic body 78 can be easily removed from headrest-pillow 64 and used to tend to the needs of an injured or sick person.

Flap member 70 can be fastened to casing 68 by a zipper or other fastening or locking devices. It is to be appreciated that flap member 70 can be replaced by a sliding or hinged door. A hinged door could have a zipper or other type of locking or fastening device used therewith. A sliding door can be so configured as not to require a discrete fastener.

It is to be understood that the specific embodiments of the invention described herein are merely illustrative of the general principles of the invention. Various modifications are feasible consistent with the spirit of the invention. For example, access control means, fasteners, or locking devices other than those illustrated and/or described can be used. The casings can be made of a wide variety of materials including cloth and leather. The liners and ejector bodies can be made from a wide variety of suitable materials such as natural or synthetic sponge. A drawer can be another type of organizer. First aid supplies and equipment are placed in the drawer and the drawer is then inserted into the pillow or car headrest. Still further, the ejector means can be eliminated and the opening in the casing can be enlarged such that with the fastener open the casing can be easily folded apart to expose the stored first aid equipment and supplies. The shock absorber member (liner) is adapted to be easily removed from the casing and to be useful as first aid equipment. One example is a circular pillow in which the fastener (access control means) is a zipper which extends around a majority of the circumference thereof. In this embodiment the shock absorber liner is also circular.

We claim:

1. A pillow combination comprising:
    an outer casing which defines at least a first interior compartment and which defines at least one opening therethrough to the first interior compartment;
    a shock absorber member being adapted to fit into the first interior compartment and defining a second interior compartment which is adapted to store first aid supplies and equipment, said member also being adapted to provide comfortable padding for a person resting on the pillow, and being further adapted to be relatively easily and quickly removed from the first interior compartment and to be useful as first aid equipment;
    access control means is joined to the pillow to control access to the interior compartments through the opening in the casing; and
    ejector means adapted to fit into the second interior compartment and to cause first aid supplies and equipment which may be stored therein to be at least partially ejected when the access control means allows access to the interior compartments.

2. The pillow of claim 1 wherein the ejector means is an elastic body.

3. The pillow of claim 1 wherein the ejector means is an elastic body which includes a spring member therein.

4. The pillow of claim 1 wherein the ejector means is a spring-piston member.

5. The pillow of claim 1 wherein the ejector means is a catapult-type ejector.

6. The pillow of claim 1 wherein the access control means is a fastener.

7. The pillow of claim 6 wherein the fastener is a VELCRO-type fastener.

8. The pillow of claim 6 wherein the fastener is a zipper.

9. The pillow of claim 1 further comprising an organizer whose structure defines a plurality of sections thereof which are adapted to store first aid supplies and equipment, the organizer being adapted to fit into the pocket of the member.

10. The pillow of claim 9 wherein the organizer is made of a flexible, transparent material.

11. The pillow of claim 1 wherein the outer casing defines a plurality of openings therethrough.

12. The pillow of claim 11 wherein the shock absorber member defines a plurality of pockets which are equal in number to the number of openings in the outer casing.

13. The pillow of claim 1 wherein the ejector means is adapted to be relatively easily removed from the pocket of the member.

14. The pillow of claim 13 wherein the ejector means is adapted to serve as first aid equipment.

15. The pillow of claim 1 being configured so as to form a car headrest.

16. A pillow combination comprising:
    an outer casing which defines at least a first interior compartment and which defines at least one opening therethrough to the interior compartment;
    a shock absorber member being adapted to fit into the first interior compartment and defining a second interior compartment, said member also being adapted to provide comfortable padding for a person in contact with the pillow;
    access control means is joined to the pillow to control access to the interior compartments through the opening in the casing; and
    ejector means adapted to fit into the second interior compartment and to cause first aid supplies and equipment which may be stored therein to be at least partially ejected when the access control means allows access to the interior compartments.

17. A pillow combination comprising:
    an outer casing which defines at least a first interior compartment and which defines at least one opening therethrough to the first interior compartment;
    a shock absorber member being adapted to fit into the first interior compartment and defining a second interior compartment which is adapted to store first aid supplies and equipment, said shock absorber member being adapted to provide comfortable padding for a person resting on the pillow, and further being adapted to be relatively easily and quickly removed from the first interior compartment and to be useful as first aid equipment; and access control means is joined to the pillow to control access to the interior compartments through the opening in the casing.

18. A pillow combination comprising:

an outer casing which defines at least a first interior compartment and which further defines at least one opening therethrough to the first interior compartment;

a shock absorber member being adapted to fit into the first interior compartment and defining a second interior compartment which is adapted to store first aid supplies and equipment, said shock absorber member being adapted to provide comfortable padding for a person resting on the pillow, and being further adapted to be relatively easily and quickly removed from the first interior compartment and to be useful as first aid equipment;

access control means joined to the pillow to control access to the interior compartments through the opening in the casing;

ejector means being adapted to fit into the second interior compartment and to cause first aid supplies and equipment which may be stored therein to be at least partially ejected when the access control means allows access to the interior compartments, said ejector means being adapted to be relatively easily and quickly removed from the second interior compartment and to be useful as first aid equipment; and an organizer whose structure defines one or more sections which are adapted to store first aid supplies and equipment, said organizer being adapted to allow storage thereof in the second interior compartment.

19. The pillow combination of claim 16 wherein the ejector means is adapted to be easily removed from the second interior compartment and is useful as first aid equipment.

* * * * *